United States Patent Office 3,362,942
Patented Jan. 9, 1968

3,362,942
PROCESS FOR POLYMERIZING AND CURING
METHYL METHACRYLATE MONOMER-POLY-
MER SIRUPS IN THE PRESENCE OF METAL
SALTS OF HEMI-PERESTERS OF MALEIC ACID
George E. Munn, Wilmington, Del., assignor to E. I. du
Pont de Nemours and Company, Wilmington, Del., a
corporation of Delaware
No Drawing. Filed Feb. 23, 1965, Ser. No. 434,692
12 Claims. (Cl. 260—89.5)

ABSTRACT OF THE DISCLOSURE

The use of certain metal salts of the hemi-perester of maleic acid as catalysts for the polymerization and curing of methyl methacrylate-containing sirups provides a substantial reduction in the curing time. The process is relatively insensitive to the amount of filler used and may be further improved by including a mercaptan chain transfer agent.

This invention relates to the polymerization and curing of methyl methacrylate-containing sirups. More particularly, it relates to the improved, more rapid production of articles of polymeric methyl methacrylate, e.g., methacrylate homopolymer and copolymers of methyl methacrylate with α,β-ethylenically unsaturated compounds (vinyl acetate, styrene, alkyl, acrylates, other alkyl methacrylates, etc.).

In the production of articles of polymeric methyl methacrylate and, more specifically, in the curing or polymerization of the monomers involved for producing the polymeric articles, the most important step is the curing of the methyl methacrylate-containing sirup. For this step it is necessary to use a catalyst, or, as it is sometimes called, an initiator. As catalysts, the prior art has suggested the use of peroxy compounds such as lauroyl peroxide and benzoyl peroxide. Recently, the use of the hemi-perester of maleic acid has been disclosed as a useful catalyst for the polymerization and curing of methyl methacrylate-containing sirups. However, it is known that, although this catalyst is quite effective, it operates rather slowly. Thus, curing times of over four hours are not uncommon in the preparation of articles of the methyl methacrylate homopolymer when curing at or near room temperature.

It is an object of this invention to provide a commercially attractive process for polymerizing methyl methacrylate. It is a more specific object to provide a process for curing methyl methacrylate-containing sirup within about two hours to produce desirable and useful polymeric articles. It is a further object to provide a process for curing methyl methacrylate-containing sirups, which also contain substantial quantities of filler, which process is relatively insensitive to the amount of filler used.

The objects are accomplished by curing a sirup containing 10–35% by weight of methyl methacrylate polymer having an inherent viscosity of 0.25–1.0 dissolved in monomeric methyl methacrylate in the presence of a small amount, usually 0.05–5 mole percent (preferably 0.1–1 mole percent) of a metal salt of a hemi-perester of maleic acid having the formula

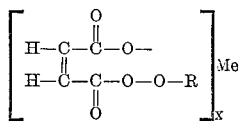

wherein Me is a metal, preferably selected from the group consisting of Group I–A metals [1] (sodium, potassium, lithium, etc.), Group II–A metals [1] (calcium, magnesium, strontium, barium, etc.), zinc, lead, cobalt, nickel, manganese, and copper;

$x$ is an integer that has a value of 1 or more up to and including the valence of the metal; and R is a saturated tertiary alkyl radical, preferably tertiary butyl.

where $x$ is an integer that is less than the valence of the metal, the other valence or valences of the metal may be satisfied by hydroxyl or the anion of the metal compound originally used or other anion available in the system.

The starting sirup or polymer-in-monomer solution may be prepared by any of the methods described in British Patent No. 870,191 or U.S. Patent No. 3,154,600. Specifically, the sirup may be made by heating a small amount of a polymerization initiator in solution in the methacrylic ester and in the presence of a chain transfer agent at a suitable pressure and temperature. Heating is continued until the solution reaches a predetermined viscosity. Thereafter, the hot solution is quenched by the addition of cold monomer containing a polymerization inhibitor. More specifically, a sirup having a viscosity of 0.5–50 poises at 25° C. can be produced from methyl methacrylate by heating the monomeric methyl methacrylate in a jacketed kettle at a temperature of 50–150° C. under refluxing conditions. Atmospheric pressure is used and the refluxing material is stirred. Heating is conducted in the presence of a very small amount of initiator and from 0.05–1.0 mole percent of a chain transfer agent such as the alkyl mercaptans and the mercaptans described in U.S. Patent No. 3,154,600. When a bulk viscosity in the range of 0.5 to 50 poises, which corresponds to an inherent viscosity of 0.25–1.0, is attained and the initiator content has been reduced substantially to zero, i.e., below 20 parts per million, the polymerization is stopped by cooling in any suitable manner. One method of cooling involves adding 1–10% by weight of cold methyl methacrylate containing sufficient hydroquinone or other polymerization inhibitor to inhibit further polymerization of the methyl methacrylate. For the purpose of the present invention, the final solution contains 10–35% by weight of the methyl methacrylate polymer dissolved in the methyl methacrylate monomer. The polymer has an inherent viscosity of 0.25–1.0 determined at 20° C. using a solution of 0.50 gram of the polymer per 100 milliliters of chloroform in accordance with the method described in F. W. Billmeyer, Textbook of Polymer Chemistry, Interscience Publishing Inc. (1957), p. 128. As mentioned previously, the polymer may also be a copolymer involving a major portion of the methyl methacrylate monomer with such monomers as vinyl acetate, styrene, methyl acrylate, ethyl acrylate, butyl acrylate, cyclohexyl acrylate, ethyl methacrylate, butyl methacrylate, cyclohexyl methacrylate, etc.

The sirup may also contain a cross-linking agent, added to the sirup in an amount up to 20% by weight upon completion of quenching. Any suitable poly-unsaturated, cross-linking agent may be used, e.g., ethylene dimethacrylate, propylene dimethacrylate, polyethylene glycol dimethacrylate, divinyl benzene, triallyl cyanurate, and diallyl phthalate. If desired, a portion, i.e., up to about 2% of the cross-linking agent may be added to the sirup prior to quenching.

Specifically, the process of this invention involves adding to the polymer-in-monomer solution the hemi-perester of maleic acid, e.g., monotertiary butyl peroxymaleate sometimes referred to as t-butyl permaleic acid in combination with a basic compound of the desired metal. As such basic compounds, one may use any metal compound that will react with the acid substituent of the hemi-per-

[1] Handbook of Chemistry and Physics, 42nd edition, Chemical Rubber Publishing Co., Ohio (1960–1961), pp. 448–449.

ester to form the metal salt of the hemi-perester. Such basic compounds include but are not limited to the oxides or hydroxides of the metals; the carbonates of sodium, potassium or zinc; the acetates of sodium, potassium, copper, strontium, magnesium, lead cobalt, manganese; the acid phthalates, bicarbonates, benzoates, phosphates, sulfides, methacrylates, etc. of sodium and potassium. Although it is most practical to add the basic compound after first dissolving the hemi-perester of maleic acid in the polymer-in-monomer sirup, it is not essential. In fact, a very useful mode of conducting the process involves the dissolution of the hemi-perester in one portion of the sirup and the suspension of the basic compound in another portion of the sirup. As long as the two portions are kept separate, they each will have relatively long pot lives. However, when they are mixed or fed as two streams into a common container, rapid curing results. The curing is accomplished in any case autogenically by merely exposing the sirup containing the metal salt of the hemi-perester of maleic acid to air at a temperature of 15–40° C. Although elevated temperatures and higher pressures may be used, they are not necessary.

In a particularly impressive process from the standpoint of rapidity of the curing, a small residual amount of the mercaptan chain transfer agent used in preparing the sirup is retained for the curing step. Thus, the curing or polymerization of the sirup is carried out in the presence of the mercaptan and the metal salt of the hemi-perester of maleic acid. The most useful mercaptans are those disclosed in U.S. Patent 3,154,600. Their structure is reproduced below:

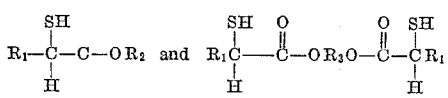

in which the R groups consist of the following substituents:

$R_1$=hydrogen, alkyl, aryl, carboxymethyl, carboalkoxymethyl, $R_2$=hydrogen, alkyl, aryl, alkoxyalkyl, alkoxyalkoxyalkyl, and $R_3$=alkylene, polyalkylene, alkylene oxide and polyalkylene oxide.

Some specific chain transfer agents include glycol dimercaptoacetate and isooctyl mercaptoacetate.

As mentioned previously, the sirup may be mixed with as much as 85% by weight of an inert additive without adversely affecting the improvements obtained by the process of this invention. Such additives include glass fibers, powdered metals, inert particles, pigments, natural and synthetic fibers and any other toughening, filling, coloring or strengthening materials. Such fillers can be any of those that do not interfere with the polymerization of the acrylic resin.

The sirups of the present invention including the metal salt of the hemi-perester of maleic acid may be used to fabricate all types of polymeric articles. Thus, the sirup may be poured on a corrugated surface to produce sheets. The sirups may be poured into molds or over fabrics, metals or layers of glass to provide useful products. The sirup may also be used as a laminating layer for wood and other plastics.

The preferred hemi-perester for forming the metal salt thereof, as stated previously, is monotertiary butyl peroxymaleate. However, other useful hemi-peresters include those where the saturated tertiary alkyl of the hemi-perester is t-amyl, 1-methylcyclohexyl and p-menthyl. The metal salt of the hemi-perester of the difunctional acid should usually be present in an amount greater than 0.05 mole percent in order to obtain the advantages of the present invention. The upper limit of 5 mole percent is merely to indicate that no additional advantage seems to be obtained by adding more than that percentage of the salt. If desired, other initiators may be used with the critical metal salt of the hemi-perester. In addition, curing aids may be used. These include the chlorides of antimony and soluble copper salts as disclosed in U.S. Patent 3,084,068, the chlorides of tin, etc.

The important improvements obtained by the present invention will be more clearly understood by referring to the examples which follow. These examples which illustrate specific embodiments of the present invention should not be construed to limit the invention in any way.

*Examples 1–11*

A sirup of 30% methyl methacrylate homopolymer in methyl methacrylate monomer, the polymer having an inherent viscosity of about 0.37 is prepared by partial polymerization in situ using glycol dimercaptoacetate as chain transfer agent substantially in the manner described in Example II of U.S. Patent 3,154,600. To 100 parts of this sirup which contains a small residual amount of the mercaptan is added 0.5 part of monotertiary butyl peroxymaleate. In all examples except the Control, one part of a finely divided basic compound is also added and mixed with the sirup to produce the metal salt of the hemi-perester. A portion of each mixture is placed in a "Gel Time" apparatus manufactured by Sunshine Scientific Company, Philadelphia, Pa., and the gel times are determined at 40° C. The results are presented in Table I.

*Example 12*

To 100 parts of the sirup of Example 1 is added 0.75 part of t-butyl peroxymaleic acid, 150 parts of "Non-Fer A1," a precipitated calcium carbonate having an average particle size of 7 microns, and various amounts of finely divided calcium hydroxide, the latter forming various amounts of the calcium salt of the hemi-perester of the maleic acid. The mixture is stirred, poured onto a tray and allowed to stand open to the air at room temperature. The speed of curing is determined by inserting a thermocouple in the mixture and measuring the interval between mixing and the time at which the mixture arrives at its peak temperature. The results are presented in Table II.

TABLE I

| Example | Metal salt of hemi-perester | Basic compound | Average Gel time (minutes) |
|---|---|---|---|
| 1 | Calcium | Hydroxide | 3.9 |
|   | do | Oxide | 21.7 |
| 2 | Sodium | Acetate | 11.1 |
|   | do | Aluminate | 20.3 |
|   | do | Benzoate | 13.3 |
|   | do | Carbonate | 10.2 |
|   | do | Bicarbonate | 53.3 |
|   | do | Cyanide | 7.9 |
|   | do | Thiocyanate | 33.9 |
|   | do | Formate | 21.4 |
|   | do | Methacrylate | 14.2 |
|   | do | Methoxide | 6.4 |
|   | do | Dihydrogen phosphate | 22.7 |
|   | do | Orthophosphate | 9.8 |
|   | do | Stearate | 12.1 |
|   | do | Sulfide | 13.9 |
| 3 | Potassium | Carbonate | 12.4 |
| 4 | Magnesium | Acetate | 14.9 |
|   | do | Hydroxide | 27.8 |
|   | do | Oxide | 32.1 |
| 5 | Barium | Hydroxide | 13.7 |
| 6 | Copper | Acetate | 61.4 |
| 7 | Strontium | do | 43.5 |
|   | do | Hydroxide | 7.7 |
| 8 | Zinc | Acetate | 6.8 |
| 9 | Lead | do | 4.5 |
| 10 | Cobalt | do | 50.6 |
| 11 | Manganese | do | 8.7 |
| Control | (Hydrogen) | None | >275 |

TABLE II

| Hemi-perester (parts) | Calcium Hydroxide (parts) | Exotherm Time (minutes) |
|---|---|---|
| 0.75 | 7.50 | 14 |
| 0.75 | 3.00 | 13 |
| 0.75 | 1.50 | 12 |
| 0.75 | 0.75 | 13 |
| 0.75 | 0.30 | 11 |
| 0.75 | 0.15 | 18 |
| 0.75 | None | 168 |

*Example 13*

The procedure of Example 12 is repeated using only 0.15 part of the hemi-perester of maleic acid and various amounts of calcium hydroxide. The "exotherm times" are measured as in Example 12 and the results are presented in Table III.

TABLE III

| Hemi-perester (parts) | Calcium Hydroxide (parts) | Exotherm Time (minutes) |
|---|---|---|
| 0.15 | 0.45 | 39 |
| 0.15 | 0.30 | 48 |
| 0.15 | 0.15 | 50 |
| 0.15 | 0.075 | 56 |

*Example 14*

The procedure of Example 12 is again repeated after first making certain that the sirup contained no residual mercaptan. In the following table, Table IV, the results obtained without any residual mercaptan are compared to the results obtained in Example 12 where residual mercaptan is present.

TABLE IV

| Example | Hemi-perester (parts) | Calcium Hydroxide (parts) | Exotherm Time (minutes) |
|---|---|---|---|
| 14 | 0.75 | 1.5 | 79 |
| 12 | 0.75 | 1.5 | 12 |
| Control | 0.75 | None | 168 |

What is claimed is:

1. A process for preparing a methyl methacrylate polymer selected from the group consisting of methyl methacrylate homopolymer and copolymers of methyl methacrylate with α,β-ethylenically unsaturated compounds which comprises curing a sirup containing 10–35% by weight of methyl methacrylate polymer, having an inherent viscosity of 0.25–1.0, in monomeric methyl methacrylate, in the presence of a small amount of a metal salt of a hemi-perester of maleic acid having the formula

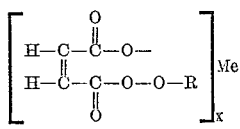

wherein
Me is a metal selected from the group consisting of Group IA metals, Group IIA metals, zinc, lead, cobalt, nickel, manganese and copper;
x is an integer having a value of from 1 to the valence of the metal; and
R is a saturated tertiary alkyl radical.

2. A process as in claim 1 wherein said methyl methacrylate polymer is methyl methacrylate homopolymer.

3. A process as in claim 1 wherein said metal is calcium.

4. A process as in claim 1 wherein R is tertiary butyl.

5. A process for preparing a methyl methacrylate polymer selected from the group consisting of methyl methacrylate homopolymer and copolymers of methyl methacrylate with α,β-ethylenically unsaturated compounds which comprises curing a sirup containing 10–35% by weight of methyl methacrylate polymer, having an inherent viscosity of 0.25–1.0, in monomeric methyl methacrylate, in the presence of a small amount of a metal salt of a hemi-perester of maleic acid having the formula

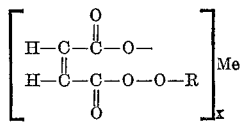

wherein
Me is a metal selected from the group consisting of Group IA metals, Group IIA metals, zinc, lead, cobalt, nickel, manganese and copper;
x is an integer having a value of from 1 to the valence of the metal; and
R is a saturated tertiary alkyl radical, and also in the presence of a small amount of a mercaptan chain transfer agent.

6. A process as in claim 5 wherein said mercaptan chain transfer agent is selected from the group consisting of glycol dimercaptoacetate and isooctyl mercaptoacetate.

7. A mixture for preparing methyl methacrylate polymers selected from the group consisting of methyl methacrylate homopolymer and copolymers of methyl methacrylate with α,β-ethylenically unsaturated compounds consisting essentially of a sirup containing 10–35% by weight of methyl methacrylate polymer, having an inherent viscosity of 0.25–1.0, in monomeric methyl methacrylate, and a small amount of a metal salt of a hemi-perester of maleic acid having the formula

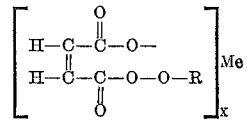

wherein
Me is a metal selected from the group consisting of Group IA metals, Group IIA metals, zinc, lead, cobalt, nickel, manganese and copper;
x is an integer having a value of from 1 to the valence of the metal; and
R is a saturated tertiary alkyl radical.

8. A mixture as in claim 7 wherein said methyl methacrylate polymer is methyl methacrylate homopolymer.

9. A mixture as in claim 7 wherein said metal is calcium.

10. A mixture as in claim 7 wherein R is tertiary butyl.

11. A mixture for preparing methyl methacrylate polymers selected from the group consisting of methyl methacrylate homopolymer and copolymers of methyl methacrylate with α,β-ethylenically unsaturated compounds consisting essentially of a sirup containing 10–35% by weight of methyl methacrylate polymer, having an inherent viscosity of 0.25–1.0, in monomeric methyl methacrylate, and a small amount of a metal salt of a hemi-perester of maleic acid having the formula

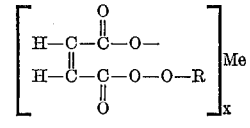

wherein

Me is a metal selected from the group consisting of Group IA metals, Group IIA metals, zinc, lead, cobalt, nickel, manganese and copper;

$x$ is an integer having a value of from 1 to the valence of the metal; and

R is a saturated tertiary alkyl radical, and a small amount of a mercaptan chain transfer agent.

12. A mixture as in claim 11 wherein said mercaptan chain transfer agent is selected from the group consisting of glycol dimercaptoacetate and isooctyl mercaptoacetate.

References Cited

UNITED STATES PATENTS 3,154,600  10/1964  Munn _____ 260—89.5

FOREIGN PATENTS 1,002,669  6/1964  Great Britain.

JOSEPH L. SCHOFER, *Primary Examiner.*

H. WONG, JR., *Assistant Examiner.*